Nov. 2, 1965   C. FRENDOCK   3,215,349
FUEL CONTROL VALVE DEVICE
Filed July 27, 1962   5 Sheets-Sheet 1

INVENTOR.
CHARLES FRENDOCK
BY Roy E. Raney
ATTORNEY

Nov. 2, 1965
C. FRENDOCK
3,215,349
FUEL CONTROL VALVE DEVICE
Filed July 27, 1962
5 Sheets-Sheet 2
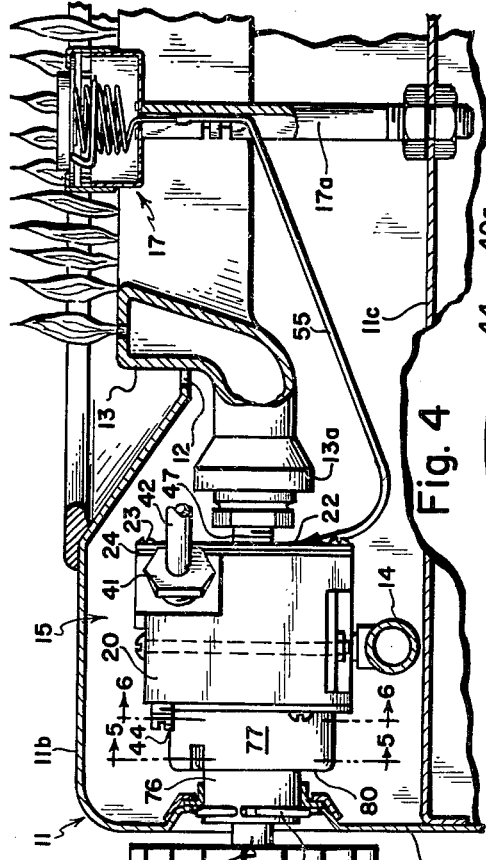
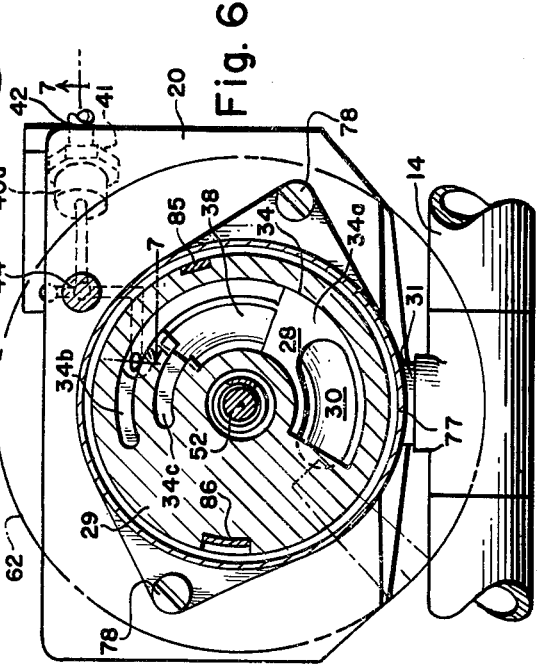
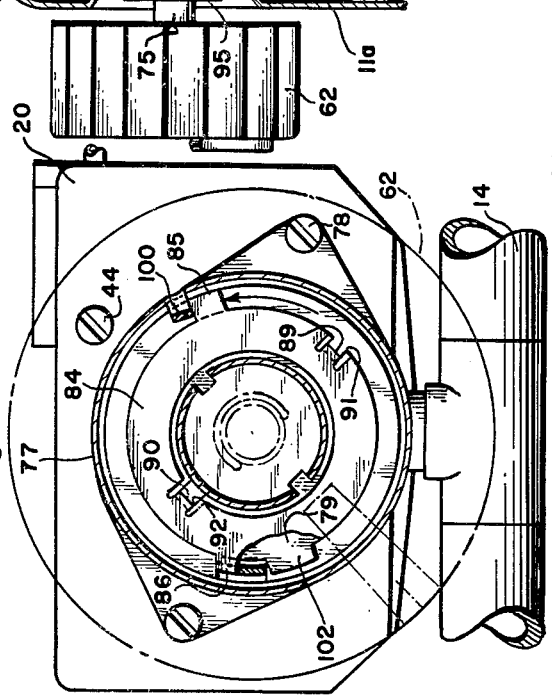
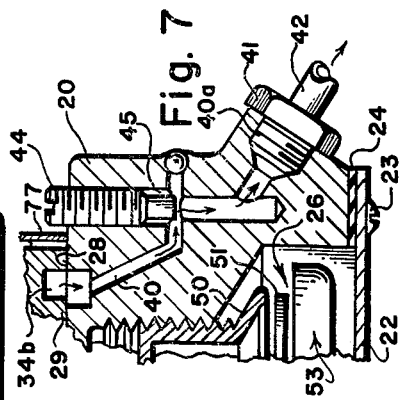
INVENTOR.
CHARLES FRENDOCK
BY Roy E. Raney
ATTORNEY Nov. 2, 1965   C. FRENDOCK   3,215,349
FUEL CONTROL VALVE DEVICE
Filed July 27, 1962   5 Sheets-Sheet 3
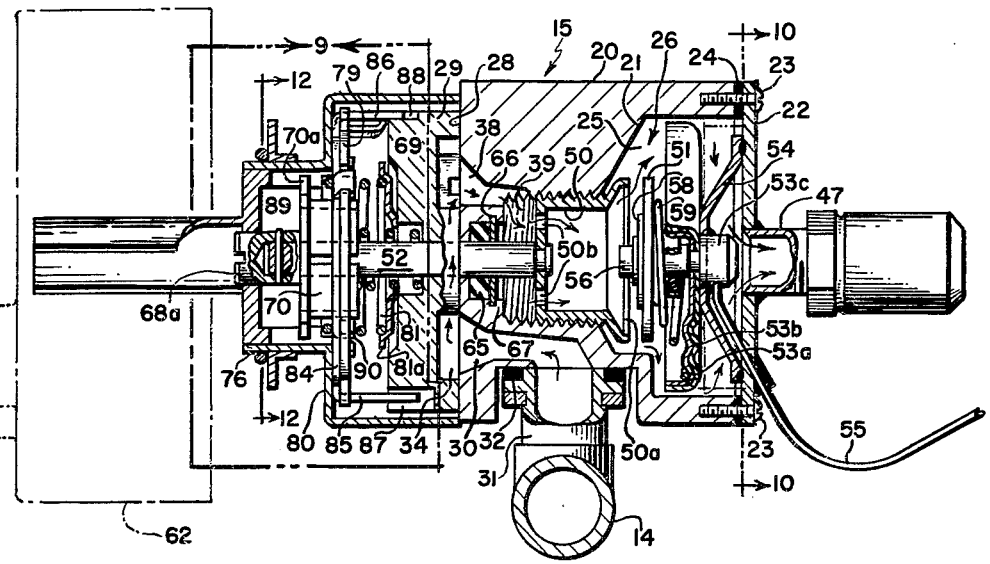
Fig. 8
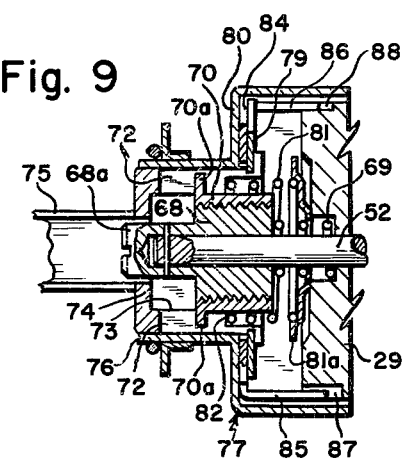
Fig. 9
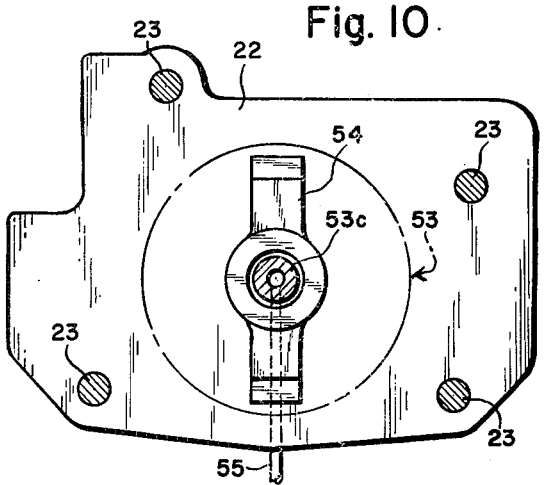
Fig. 10
Fig. 11   Fig. 12   Fig. 13
INVENTOR.
CHARLES FRENDOCK
BY Roy E. Raney
ATTORNEY INVENTOR.
CHARLES FRENDOCK
BY Roy E. Raney
ATTORNEY

United States Patent Office 3,215,349
Patented Nov. 2, 1965

3,215,349
FUEL CONTROL VALVE DEVICE
Charles Frendock, Red Bank, N.J., assignor to The Wilcolator Company, Elizabeth, N.J., a corporation of Delaware
Filed July 27, 1962, Ser. No. 212,878
1 Claim. (Cl. 236—99)

This invention relates generally to control valves for manually and thermostatically regulating the supply of gas to cooking stove burners and which can be used interchangeably with the usual manual gas cocks. More particularly, the invention is directed to an improved control valve device of the type mentioned having manual control means rotatable about a common axis by which the user can choose the maximum flame height and can also select a cooking temperature which the valve device will thermostatically maintain, the gas outlet of which can readily be provided either in alignment with the axis about which the control means is rotated or at right angles thereto.

As a principal object this invention aims to provide manually and thermostatically operated gas valve devices of the aforementioned character comprising a valve body having inlet and outlet connections and a rotatable control shaft extending from the body supporting a control knob at the outer end of the shaft, the axes of the inlet and outlet connections and the control shaft being so arranged that the valve device can be installed in a gas cooking range in the space normally occupied by the usual manual gas cock for a top burner without altering the gas supply manifold or the burner intake. In one preferred embodiment the axes of the inlet and outlet connections are disposed at right angles to one another and the control shaft extends from the side of the body opposite the outlet connection and in axial alignment thereunto to support at its outer end a knob disposed on the front surface of a range, the shaft being operative to position a coaxial "on-off" and flame height adjusting rotary valve member, and operative to position a rotatable and axially shiftable annular valve seat which cooperates with a valve member actuated by a circular wafer type thermally expansible power element disposed in the valve body between the outlet connection and the valve seat and in axial alignment with the control shaft, valve seat, valve members, and outlet connection. In another embodiment, suitable for use wherein the control knob is disposed on the horizontal upper surface of a range, the inlet and outlet connections are in axial alignment and on opposite sides of the valve body, while the control shaft, valve members, valve seat, and power element are in axial alignment with one another and at right angles with the axis of the inlet and outlet connections.

Another object of this invention is the provision of a particularly compact gas control valve device including a body extending normal to the axis of the control shaft and provided with passages which cooperate with recesses in a valve disc which is coaxial with the control shaft and rotatable to control gas flow from the inlet connection into the valve body, the valve device comprising a thermostatically operated second valve including a circular valve seat member positionable axially of the control shaft and engageable by a thermostatically actuated valve member to control the flow of gas from the valve body to the burner through an outlet connection which is in axial alignment with the control shaft and on the opposite side of the valve body, the valve member being moved by a circular wafer type expandable member axially in alignment with the control shaft and thermostatic valve member and supported by bridge means over the outlet connection to permit flow of gas around the expandable member and through the axially aligned outlet connection.

Yet another object of the invention is the provision of a gaseous fuel control device including a body having two circular valve members therein, for selecting an operating temperature and a maximum flame height for example, which are rotatable about a common axis by manual rotation of a control member, preferably in the form of a knob supporting shaft, the control member being connected by frictional drive means to one of the valve members for effecting normal positioning thereof by the control member yet permitting positioning thereof independently of the control member for calibrating purposes, the control member being releasably connected to the other of the valve members by clutch means disengageable by longitudinal movement of the control member axially of the valve members to permit positioning of the one valve member by the control member independently of the other valve member. In one practical embodiment of the invention the frictional drive means comprises a drive shaft attached at one end to the one valve member and having the other end surrounded and frictionally gripped by a coupling member, the coupling member normally maintaining a frictional rotary driving relationship between the control member and the drive shaft while permitting longitudinal movement between the control member and the other valve member. The frictional coupling may be overcome to permit calibrating adjustment of the one valve member by rotating the drive shaft with a suitable tool such as a screw driver while holding the control member and other valve member stationary.

The invention may be said to reside in certain constructions and arrangements of parts by which these and other objects and advantages are achieved, the inventioin being more fully described in the following detailed description of a presently preferred embodiment thereof taken in conjuiction with the accompanying sheets of drawings, forming a part of this specification, and in which FIG. 1 is a fragmentary sectional view of a gas cooking range showing a gas control valve which embodies this invention installed therein;

FIG. 4 is a view similar to FIG. 1 but showing the valve turned to an "on" position and the burner alight;

FIG. 5 is an enlarged sectional view taken along line 5—5 of FIG. 4;

FIG. 6 is an enlarged sectional view taken along line 6—6 of FIG. 4;

FIG. 7 is a fragmentary sectional view taken along line 6—6 of FIG. 4;

FIG. 7 is a fragmentary sectional view taken along line 7—7 of FIG. 6;

FIG. 8 is an enlarged longitudinal sectional view of the control valve when in the "on" position of FIG. 4;

FIG. 9 is a fragmentary sectional view similar to a portion of FIG. 8 but showing other parts thereof in section;

FIG. 10 is a sectional view taken along line 10—10 of FIG. 8 but on an enlarged scale;

FIG. 11 is a fragmentary sectional view taken substantially along line 11—11 of FIG. 1 and illustrating a shaft locking means;

FIG. 12 is a fragmentary sectional view similar to FIG. 11 but showing parts in different positions as viewed substantially along line 12—12 of FIG. 8;

FIG. 13 is a fragmentary sectional view taken along line 13—13 of FIG. 11;

Although control valves embodying this invention may be utilized for controlling gas flow to burners for baking ovens, kilns, and the like, the invention will be described hereinafter with reference to use in a domestic range having top burners.

Figure 1:
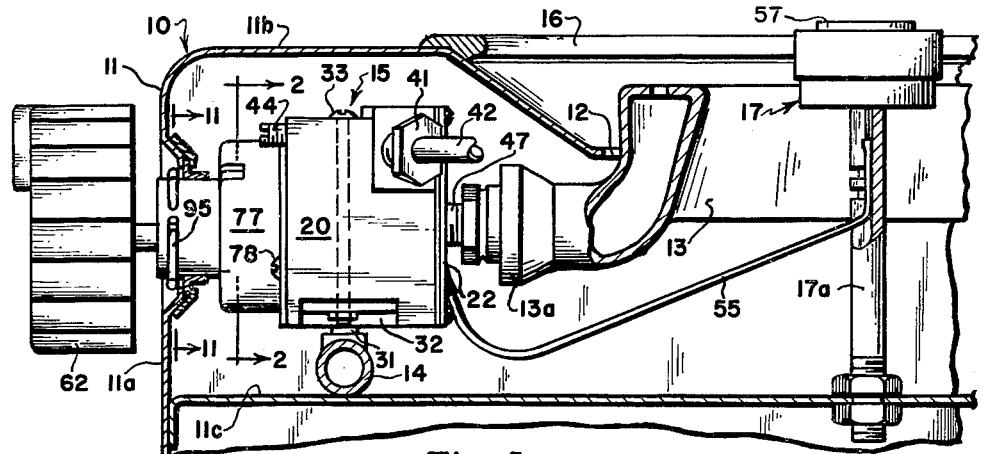

Referring to FIG. 1, there is shown a range 10 of conventional construction including a housing 11 having a front wall 11a, a top wall 11b, and a shelf 11c. The top wall 11b is dished to provide a recessed opening 12 in which is mounted an annular gas burner 13 having an inlet connection 13a. A gas supply manifold 14 extends transversely within housing 11, and a thermostatically operated gas control valve device 15 embodying this invention is connected between the manifold 14 and the burner inlet 13a. Valve device 15 is operative to control the flow of gas to burner 13 to regulate the maximum flame height and to thermostatically regulate the flow according to the temperature of a cooking vessel (not shown) resting on a grid 16 above the burner and engaging a temperature sensing element 17 which is disposed centrally of burner 13 and supported by a post 17a from shelf 11c.

Referring now to FIG. 8, valve device 15 comprises a generally rectangular body 20 having a generally conical shaped recess 21 formed therein, the larger end of which is closed by a cover member 22 secured to body 20 by screws 23 with a suitable gasket 24 interposed therebetween to form a chamber 25. Within the chamber 25 is an adjustable thermostatic valve means, generally indicated at 26, which is later described in detail and serves to effect the thermostatic temperature regulation of the burner 13.

The other end of body 20 is provided with a flat smooth face 28 which serves as a seat for a rotatable valve disc 29 which is arranged to rotate relative to face 28 while maintaining a gas tight seal with the areas engaged thereby. The valve disc 29 serves as an "on-off" valve and also to select the maximum flame height. To this end, body 20 is provided with a gas inlet passage 30, one end of which is connected with manifold 14 by a nipple 31 having a flange 32 secured to valve body 20 as by screws 33 (FIG. 1), and the other end of which opens in face 28. Valve disc 29 is provided with a recess 34, facing surface 28 and, as may be seen in FIGS. 3 and 6, this recess has a wide arcuate portion 34a having an arc of about 175°, which is in registration with the opening of passage 30 and which merges with two smaller concentric arcuate recess extensions 34b and 34c. The recess 34 forms gas passages between inlet passage 30 and outlet passages through the body according to the angular position of valve disc 29 as is described more fully hereinafter.

Figure 3:
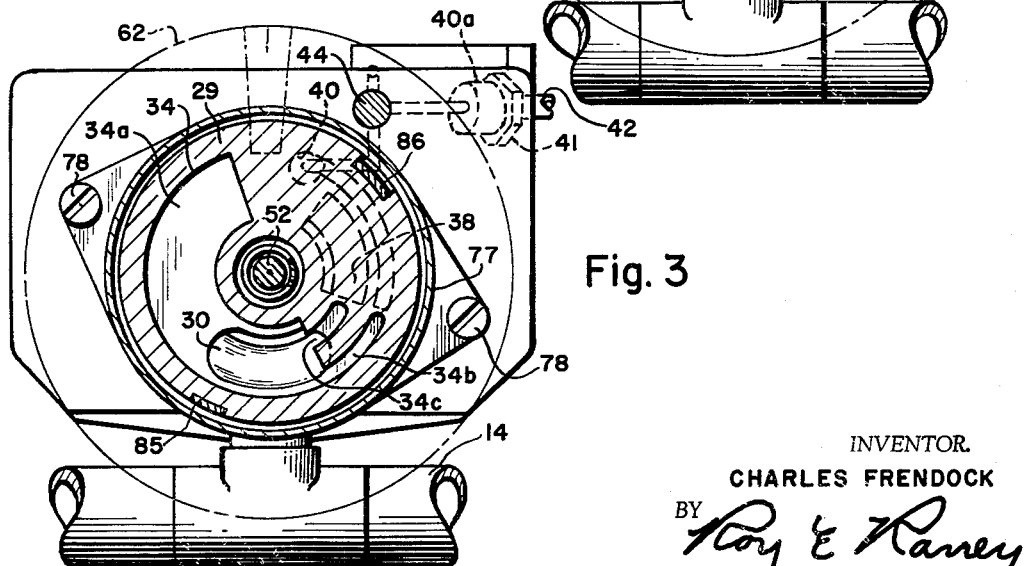
FIG. 3 is a sectional view of the valve of FIG. 1 taken along line 3—3 thereof but on an enlarged scale.

Valve body 20 is provided with a main gas outlet passage 38 leading from surface 28 to a threaded bore 39 at the smaller end of recess 21. A pilot burner supply passage 40 leads from surface 28 to a threaded outlet 40a in which is secured a threaded connector 41 for a pilot burner supply line 42. Passage 40 has an arcuate recess extension 40a in surface 28 and having a radius equal to recess extension 34b in valve disc 29. When valve disc 29 is in its "off" position as shown in FIG. 3, the main flow port or passage 38 and the pilot flow passage 40 are closed off. Upon initial rotation of valve disc 29 in a counterclockwise direction a supply of gas is fed to pilot burner line 42 via inlet passage 30, recess portion 34a, arcuate recess extension 34b, passage 40, and line 42 to a control pilot (not shown) adjacent burner 30. The flame height at the pilot may be adjusted by means of a plug 44 threaded into a bore 45 intersecting with passage 40 as is best shown in FIG. 7.

Valve disc 29 may be rotated in a counterclockwise direction from the "off" position of FIG. 3 through intermediate graduated flame height positions to the maximum flame height position shown in FIG. 6. In doing so, a path of gas flow is established between inlet passage 30 and main gas flow passage 38 via the arcuate recess 34 with the narrow extension 34c thereof providing flow for the lower flame heights, and the volume of flow for the higher range of flame depending upon the length of recess section 34a exposed to inlet opening 30. Preferably, the depths of recess portion 34a and extension 34c are graduated to provide greater passage area as the disc 29 is turned in a counter-clockwise direction.

Gas passes from passage 38 and threaded bore 39 into chamber 25 through the mentioned thermostatically operated valve mechanism 26, and exits through an outlet nipple 47 which is brazed in an opening in cover plate 22 and is adapted to be fitted into burner inlet connection 13a. The thermostatically operated valve means 26 comprises a cup shaped valve seat member 50 threaded into threaded bore 39 and having a circular, flaring end opening into chamber 25 to provide an annular valve seat 50a. The valve seat member 50 has an end wall provided with openings 50b through which gas enters from threaded bore 39. Seat member 50 can be rotated in threaded bore 39 to vary its axial position relative to a thermostatically positioned disc-like valve member 51 by operation of a drive shaft 52 connected to the end wall of the valve seat member as shown.

An expansible thermally responsive member 53 is rigidly mounted on cover plate 22 in spaced relation from the outlet opening leading to nipple 47 by means of a bridge-like bracket 54, and preferably comprises two nested corrugated flexible discs welded together about their rims and which form an expansible chamber containing a relatively small volume of thermally expansible fluid. Disc 53b has a centrally located boss 53c soldered or brazed to bracket 54 and is bored to receive one end of a capillary tube 55 brazed therein and to form a passage between the interior of element 53 and the tube, the other end of which tube is connected with a temperature sensing bulb 57 forming part of the temperature sensing unit 17.

The element 53, tube 55 and bulb 57 are filled with a suitable fluid, preferably liquid, which expands and contracts upon increases and decreases in temperature to cause corresponding distention and contraction of the element 53 in a manner which is well known in the art. Disc 53a is provided with a stem 56 on which is mounted the aforementioned disc-like valve member 51 which is adapted to be moved toward and away from seat 50a by expansion and contraction of expansible element 53 in response to temperature changes sensed by bulb 57. Valve member 51 is preferably mounted on stem 56 between a bimetallic washer 58 and a spring 59 which permits limited movement thereof with respect to the stem to assure proper alignment with the valve seat 50a. The bimetal washer 58 flexes in response to changes in temperature at the member 53 to vary the spacing between the expansible member and valve 51 to compensate for changes in volume of the liquid inside the expansible member due to temperature changes inside the valve body. A resilient "O" ring 60 provides a seal between the valve disc 29 and the stem 56. It will be understood that drive shaft 52, expansible element 53, valve member 51, and outlet nipple 47 are all axially aligned.

It will be appreciated that the flow of gas to valve seat member 50 may be regulated from an "off" condition to a graduated full "on" position according to the angular position of disc valve 29 and that the flow of gas through the thermostatic valve comprising seat member 50 and valve member 51 to outlet nipple 47 will be in accordance with the position of valve member 51 relative to seat member 50 as determined by the longitudinal position of member 50 in the threaded bore 39 in the valve body and the temperature at bulb 57.

The angular position of valve disc 29 and the position of seat member 50 are adjustable individually by a single knob 62 which is drivingly connected with shaft 52 in such a manner that after the valve disc 29 is set in a position to provide the maximum flame desired, the knob can be disengaged from driving relation therewith and used to rotate and axially position valve seat member 50 independently of valve disc 29 and thereby adjust the operating temperature of the thermostatic valve. To this end, the inner end of shaft 52 is supported for axial and rotatable movements by a packing washer 65 secured in a recess at the bottom of threaded bore 39 by a washer 66 held in place by a rolled-over lip 67. The intermediate portion of shaft 52 extends freely through a central opening in valve disc 29, and the outer end of the shaft is pinned in an externally threaded bushing 68 so that it rotates with the latter.

Bushing 68 is urged outwardly or to the left as viewed in FIG. 8, for example, by a compression spring 69 disposed between the bushing and valve disc 29 and acts to hold the valve disc against surface 28 and to provide a drag against rotation of valve seat member 50 in bore 39. Bushing 68 has a stem portion 68a, the end of which has a screwdriver slot which permits rotation of shaft 52 independently of knob 62 for calibrating purposes in a manner to be described hereinafter. The bushing proper is threadedly engaged in an internally threaded coupling member in the form of a sleeve 70 having diametrically extending ears 70a.

Sleeve 70 is slotted to form fingers having an inward set for resiliently and frictionally gripping the bushing 68 threadedly engaged therein, against rotation within the sleeve except during calibration. The ears 70a are slideably engaged in axially extending, opposed slots 72 in the cylindrical side walls of a cup shaped control or drive member 73. Member 73 has an end wall 74 having a central opening in which is secured a semi-cylindrical control shaft 75 through which is exposed the screw driver slotted stem portion 68a of the bushing 68 which may thereby be rotated within the sleeve 70 to vary the position of the seat member 50 independently of the shaft 75 and control knob 62 in calibrating the device.

The drive member 73 is supported for rotational and axial movement in a cylindrical sleeve portion 76 of an annular cover member 77 secured by screws 78 to the valve body 20, and it will be recognized that the ears 70a and slotted member 73 serve as a sliding spline connection and cooperate to maintain rotary driving relation between control shaft 75 and shaft 52, through the frictional engagement of sleeve 70 and bushing 68, while permitting axial movement of control shaft 75 with respect to shaft 52 and cover member 77.

The drive member 73 includes a radially extending flange 79 and is biased outwardly toward a shoulder portion 80 of cover member 77 by a compression spring 81 acting between a washer member 81a, disposed against valve disc 29 and an inner shoulder 82 in the drive member as is best seen in FIG. 9.

A disengageable drive is provided between control shaft 75 and valve disc 29 and comprises an annular drive ring 84 interposed between flange 79 of member 73 and shoulder portion 80 of cover member 77. A pair of drive lugs 85 and 86 extend from the drive ring 84 into engagement with recesses 87 and 88, respectively, in the peripheral portion of valve disc 29.

Figure 2:
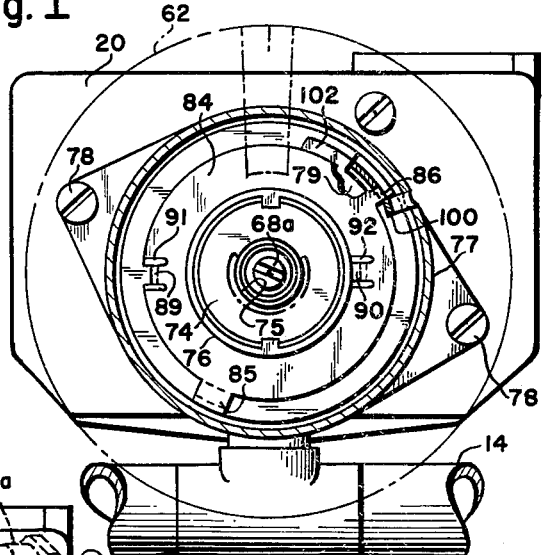
FIG. 2 is a sectional view of the valve of FIG. 1 taken substantially along line 2—2 thereof but on an enlarged scale.
Figure 14:
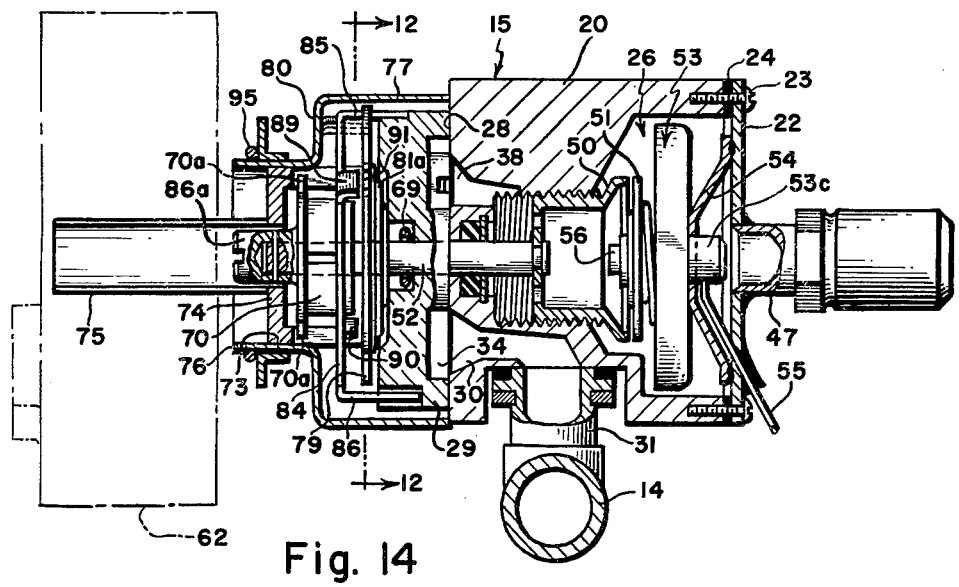
FIG. 14 is a sectional view similar to FIG. 8 but with some parts thereof shown in different positions.

Drive ring 84 is releasably connected to flange 79 for rotation by shaft 75 by tabs 89 and 90, best seen in FIGS. 2, 9, and 14, which normally extend into notches 91 and 92 formed in flange 79 of drive member 73, and the action of spring 81 urges drive member 73 and control shaft 75 outwardly to normally retain the tabs in the notches to provide a positive drive between the control shaft and the valve disc 29. It will be seen by reference to FIG. 14 that by pressing shaft 75 axially inwardly, the notches 91 and 92 of flange 79 are withdrawn from tabs 89 and 90 to disengage these parts and permit rotation of control shaft 75, coupling member 70, drive shaft 52 and valve seat member 50 independently of valve disc 29 to select an operating temperature.

In order to assure that the valve disc 29 is rotated into a position in which at least some gas flows through the device before it is disengaged from the control shaft 75, means are provided to prevent inward axial movement of the control shaft until a predetermined angular rotation thereof has been accomplished. For this purpose, and as is best shown in FIGS. 11–13, a ring-like locking spring 95 surrounds sleeve portion 76 of cover member 77 and has an indented portion 95a engaged in a slot 96 in one side of the sleeve portion. Locking springs 95 has an inturned end 95b extending through a slot 97 in the sleeve portion 76 opposite slot 96 and engaged in a groove 98 in the cylindrical wall of drive member 73. The end 95b cooperates with groove 98 to prevent axial movement of shaft 75 when in the FIG. 3 off position, and is bent into a smooth curve so that initial rotation of the shaft 75 and member 73 through about 15 degrees from the off position will drive the end 95b out of groove 98 as shown in FIG. 12. After the end 95b of locking spring 95 is driven from groove 98, and valve disc 29 is positioned to select a desired flame height, the control shaft 75 may be moved axially inwardly to disengage the control shaft from driving relation to the valve disc as explained above.

Rotation of valve disc 29 in opposite directions by control shaft 75 is limited by lugs 85 and 86 striking opposite sides of an inwardly struck stop 100 located at one end of cover member 77 as may be seen in FIG. 2. When shaft 75 is in the angular position shown in FIGS. 2 and 3 valve disc 29 is in a fully off position, and as shaft 75 is operated to rotate valve disc 29 counterclockwise an increasing amount of gas flow is permitted to the thermostatic means 26 through recesses 34 and 34a until tab 85 engages stop 100 as shown in FIG. 6. This range of movement therefore permits adjustment of the maximum flame height to be used.

Figure 15:
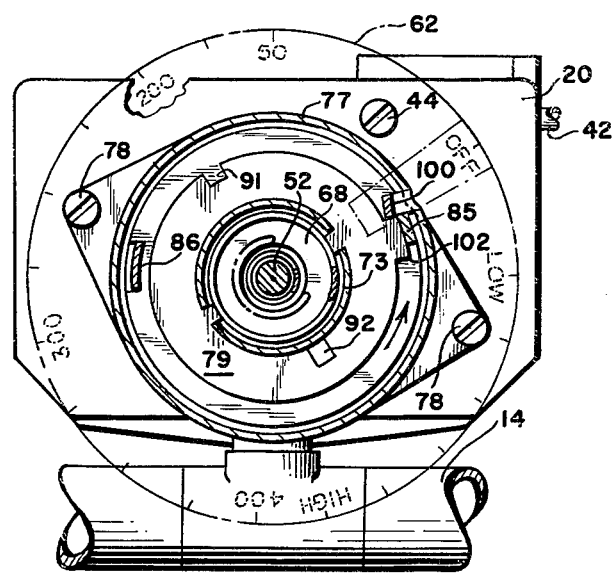
FIG. 15 is a sectional view taken along line 12—12 of FIG. 11.

After valve disc 29 is positioned to select the desired maximum flame height, the thermostatic valve means 26 may be adjusted to provide a predetermined temperature at bulb 57 by pressing knob 62 and shaft 75 inwardly to release drive ring 84 from member 73 so that shaft 52 may be rotated by knob 62 independently of valve disc 29 to position valve seat member 50 relative to thermostatic valve member 51 and establish the proper adjustment of the thermostatic valve to provide the temperature desired. Counterclockwise rotation of knob 62 in its temperature setting range of movement is limited by a boss 102 projecting from the periphery of flange 79 of member 73 and adapted to strike stop 100 on cover member 77 as shown in FIG. 15.

From the foregoing it will be seen that during the first approximately 130° of rotation of knob 62 counterclockwise from the "off" position, a range of flame height regulation is provided between definite stop limitations, and that further rotation of knob 62, following inward pressing thereof, is available for temperature regulation.

Figure 16:
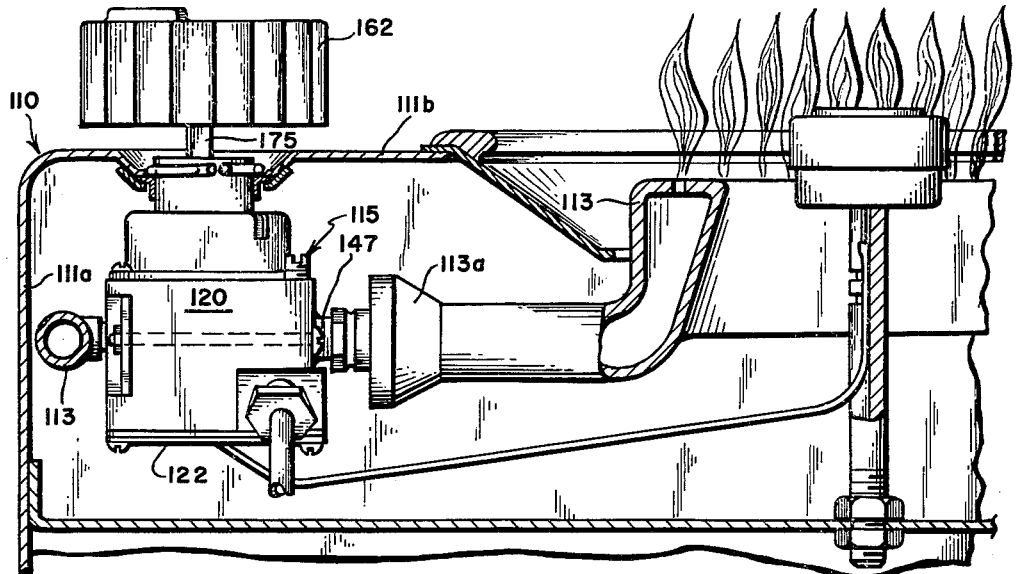
FIG. 16 is a view similar to FIG. 1 but showing a modified form of gas control valve in association with the range.
Figure 17:
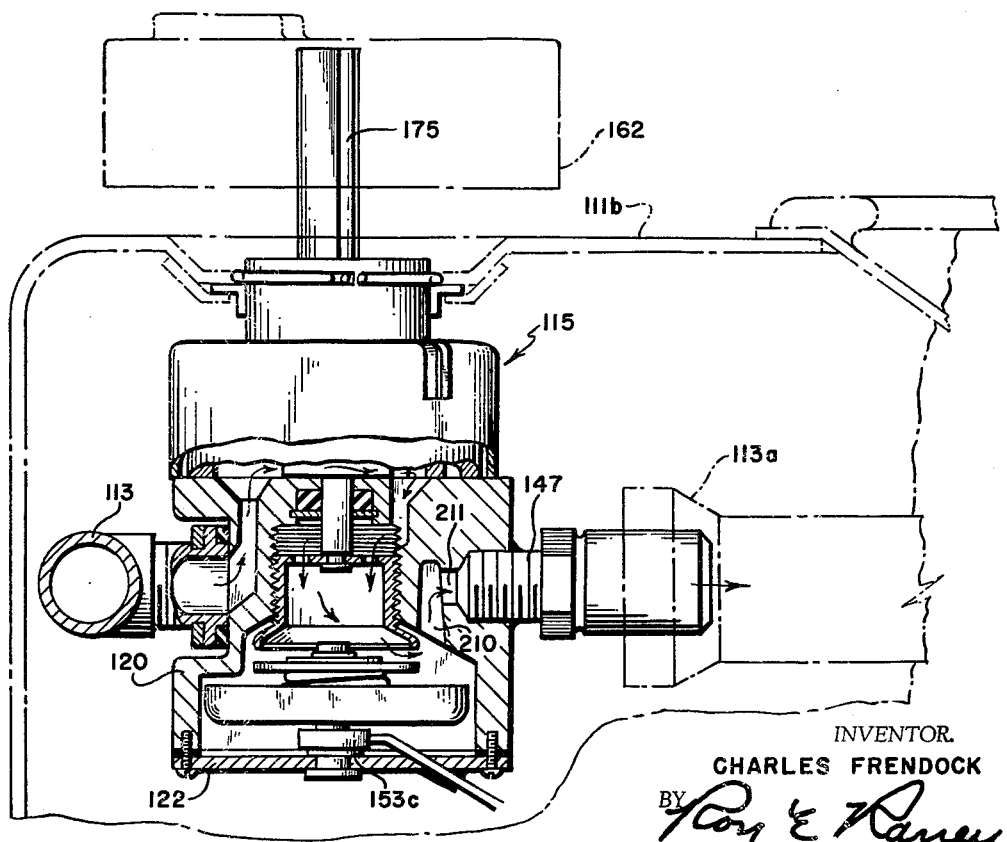
FIG. 17 is an enlarged view of the control valve of FIG. 13 with portions thereof shown in vertical section.

In some instances it is desirable to provide a so called "counter top" gas valve device for cooking ranges in which the control shaft is in a vertical position so that the knob thereon rotates in a plane parallel to the top of the stove. Such a valve device 115 embodying this invention is illustrated in FIGS. 16 and 17 wherein the control valve device is shown in association with a portion of a counter-top type cooking range 110. The gas control device 115 is in many respects like the device 15 described above and corresponding parts are designated by corresponding reference characters to which 100 has been added.

Range 110 includes a front wall 111a, a top wall 111b and a shelf 111c. The top surface 111b is dished and open to receive an annular gas burner 113 having an inlet connection 113*a*. A gas manifold 114 extends along front wall 111*a* and inlet nipple 131 interconnects inlet 130 of body 120 with manifold 114 to supply gas to the valve body. The flow of gas through body 120 of control device 115 is like that described with reference to control device 15 with the exception that end plate 122 replaces end plate 22. Plate 122 has no outlet therethrough and the boss 153*c* is secured directly in an opening in the plate as shown in FIG. 17.

The gas outlet in body 120 of device 115 is provided by drilled passages 210 and 211, the latter having an outlet nipple 147 attached therein and which is connected with burner inlet 113*a*. Passages 210 and 211 are located so that outlet nipple 147 is axially aligned with inlet nipple 131 and is disposed at right angles to control shaft 175 so that device 115 can be installed in the same manifold burner inlet space relation as is provided for the usual manual gas cock so that the stove manufacturer may readily supply either automatic or manual gas controls.

Although but two forms of the invention have been shown, it is understood that other forms, modifications and adaptations thereof could be made all within the scope of the following claim.

Having thus described my invention, I claim:

A gas flow control valve device comprising:

(a) a hollow valve body and a cover member defining a chamber, said body having an inlet connection and said cover member having a tubular outlet connection, (b) control means including a shaft supported for rotation about an axis aligned with the axis of said outlet connection, (c) manually positionable valve means comprising a first valve member rotatable about said axis by said control means for controlling gas flow through said inlet connection, (d) thermostatic valve means comprising a second valve member rotatable about said axis by said control means, and a disc shaped thermally expansible element disposed in said chamber between said second valve member and said outlet connection, and (e) means comprising a bracket having a central portion attached to the central portion of said expansible element and radially extending parts secured to said cover for support of said expansible element with the axis thereof in alignment with said axis and in spaced relation to said cover member whereby gas flowing from said chamber passes between said expansible element and said cover member to said outlet.

References Cited by the Examiner
UNITED STATES PATENTS

| | | | |
|---|---|---|---|
| 2,801,800 | 8/57 | Brumbaugh | 137—637.4 XR |
| 2,980,386 | 4/61 | Reinhart | 236—99 XR |
| 3,011,721 | 12/61 | Wiltz | 137—636 XR |
| 3,065,913 | 11/62 | Holzboog | 236—99 XR |

WILLIAM F. O'DEA, *Primary Examiner.*